(12) United States Patent
Komura et al.

(10) Patent No.: US 12,142,231 B2
(45) Date of Patent: Nov. 12, 2024

(54) DISPLAY DEVICE

(71) Applicant: Japan Display Inc., Tokyo (JP)

(72) Inventors: Shinichi Komura, Tokyo (JP);
Toshiharu Matsushima, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 18/377,927

(22) Filed: Oct. 9, 2023

(65) Prior Publication Data

US 2024/0127762 A1    Apr. 18, 2024

(30) Foreign Application Priority Data

Oct. 12, 2022 (JP) .................................. 2022-163755

(51) Int. Cl.
*G09G 3/34* (2006.01)
*G06F 3/01* (2006.01)
*G09G 3/36* (2006.01)

(52) U.S. Cl.
CPC ............ *G09G 3/3406* (2013.01); *G06F 3/013* (2013.01); *G09G 3/3611* (2013.01); *G09G 2310/061* (2013.01); *G09G 2310/08* (2013.01); *G09G 2340/0435* (2013.01); *G09G 2354/00* (2013.01)

(58) Field of Classification Search
CPC .............. G06F 3/013; G09G 2310/061; G09G 2310/08; G09G 2340/0435; G09G 2354/00; G09G 3/3406; G09G 3/3611; G09G 2310/021; G09G 2310/0205; G09G 3/20
See application file for complete search history.

(56) References Cited

U.S. PATENT DOCUMENTS

2018/0240424 A1    8/2018 Aoki et al.
2019/0005884 A1*   1/2019 Yoo .......................... G06F 3/011

FOREIGN PATENT DOCUMENTS

JP         2018-136495 A      8/2018

* cited by examiner

*Primary Examiner* — Robin J Mishler
(74) *Attorney, Agent, or Firm* — K&L Gates LLP

(57) ABSTRACT

According to an aspect, a display device includes: a display panel having a display region in which pixel rows are arranged in a second direction; a scanning circuit configured to supply a drive signal to scan the pixel rows; a light source configured to emit light toward the display panel; and a light source control circuit configured to control light emission timing of the light source. The display region is divided into regions in the second direction and includes a first region including two or more pixel rows consecutively arranged in the second direction, and a second region except for the first region. The scanning circuit sequentially scans the pixel rows in the first region, and simultaneously scans two or more pixel rows consecutively arranged in the second direction in the second region.

15 Claims, 14 Drawing Sheets

DISPLAY DEVICE

CROSS-REFERENCE TO RELATED APPLICATION

This application claims the benefit of priority from Japanese Patent Application No. 2022-163755 filed on Oct. 12, 2022, the entire contents of which are incorporated herein by reference.

BACKGROUND

1. Technical Field

What is disclosed herein relates to a display device.

2. Description of the Related Art

In a known virtual reality (VR) system, a head mounted display (HMD) is disposed in front of the eyes of a user and image display is changed along with viewpoint movement. A technology with a conventional configuration including a liquid crystal display device is disclosed in which a light source is turned on to simultaneously illuminate the entire region after response of all pixels to inputting of a frame image is completed.

In a VR system, high definition of a display panel is required to display a display video in an enlarged manner. However, high definition of the display panel leads to a longer pixel writing period for one frame, and it becomes difficult to maintain a frame rate equivalent to that of a low-definition display panel in some cases.

For the foregoing reasons, there is a need for a display device that can reduce the amount of decrease in the frame rate of a high-definition display panel.

SUMMARY

According to an aspect, a display device includes: a display panel having a display region in which a plurality of pixel rows each composed of a plurality of pixels arranged in a first direction are arranged in a second direction orthogonal to the first direction; a scanning circuit configured to supply a drive signal to scan the plurality of pixel rows; a light source configured to emit light toward the display panel; and a light source control circuit configured to control light emission timing of the light source. The display region is divided into a plurality of regions in the second direction and includes a first region including two or more pixel rows consecutively arranged in the second direction, and a second region except for the first region. The scanning circuit sequentially scans the pixel rows in the first region, and simultaneously scans two or more pixel rows consecutively arranged in the second direction in the second region.

According to an aspect, a display device includes: a display panel having a display region in which a plurality of pixel rows each composed of a plurality of pixels arranged in a first direction are arranged in a second direction orthogonal to the first direction; a scanning circuit configured to supply a drive signal to scan the plurality of pixel rows; a light source configured to emit light toward the display panel; and a light source control circuit configured to control light emission timing of the light source. The display region is divided into a plurality of regions in the second direction and includes a first region including two or more pixel rows consecutively arranged in the second direction, and a second region except for the first region. The scanning circuit sequentially scans the pixel rows in the first region, and scans two or more pixel rows in a skipping manner in the second region.

DETAILED DESCRIPTION

Embodiments of the present disclosure will be described below with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In this disclosure, when an element is described as being "on" another element, the element can be directly on the other element, or there can be one or more elements between the element and the other element.

First Embodiment

Figure 1:
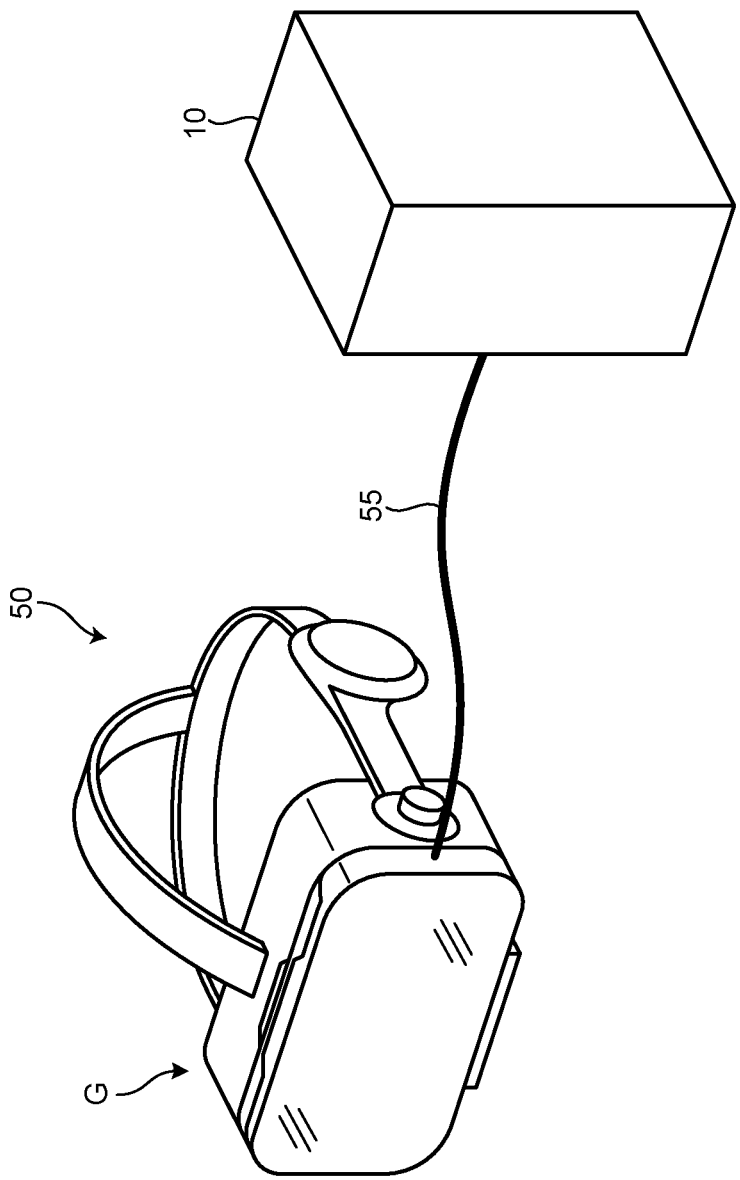
FIG. 1 is a view illustrating the main configuration of a display system.
Figure 2:
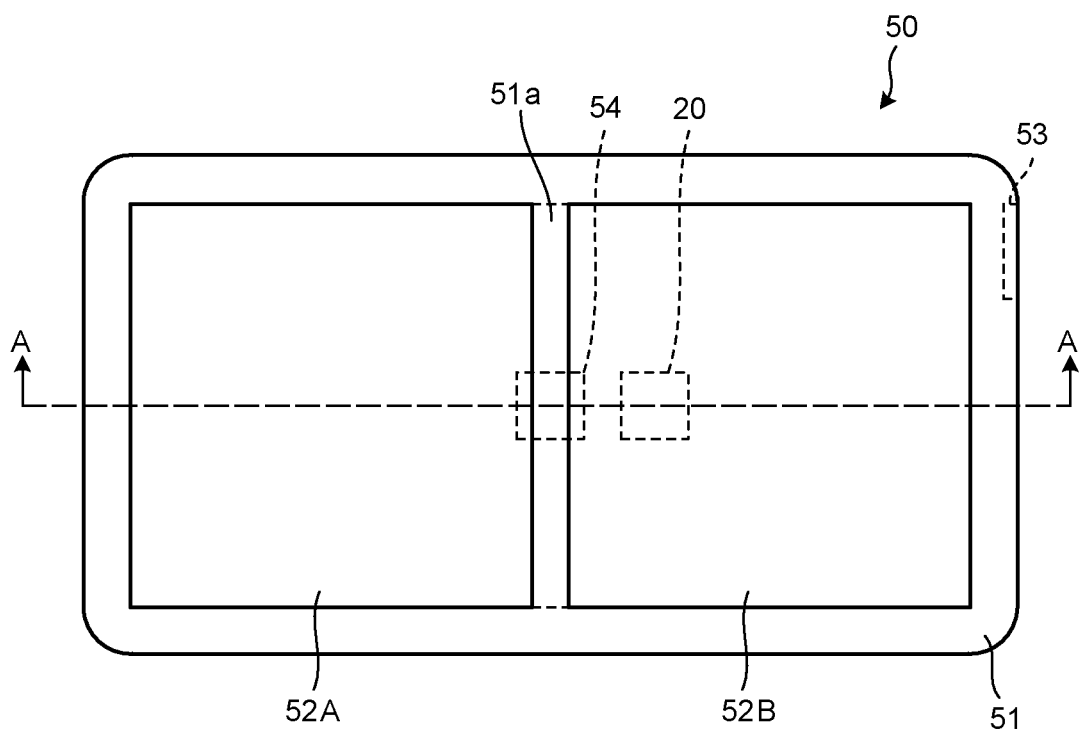
FIG. 2 is a view illustrating the main configuration of a display device.
Figure 3:
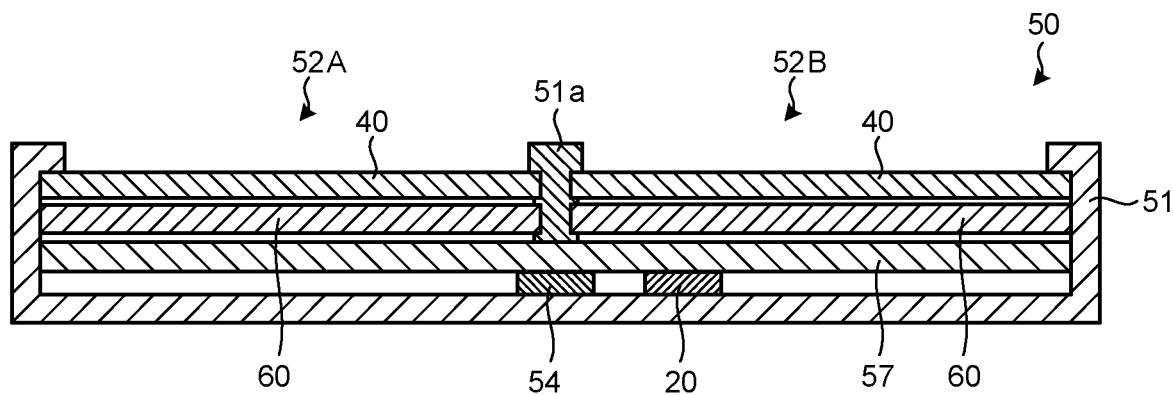
FIG. 3 is a sectional view taken along line A-A in FIG. 2.

FIG. 1 is a view illustrating the main configuration of a display system. FIG. 2 is a view illustrating the main configuration of a display device. FIG. 3 is a sectional view taken along line A-A in FIG. 2. The display system includes a display device 50 and an information processing device 10. The display device 50 is integrated with VR goggles G. The VR goggles G is an instrument that supports the display device 50 near the head of a user such that two displays 52A and 52B included in the display device 50 are aligned with the line of sight of the user.

The VR goggles G only need to be goggles that are worn on the head of a user and used by the user, and are not limited to goggles for displaying a VR video but may be goggles for displaying a video such as an augmented reality (AR) video or a mixed reality (MR) video.

The information processing device 10 outputs an image to the display device 50. The information processing device 10 is coupled to the display device 50 through, for example, a cable 55. The cable 55 transmits signals between the information processing device 10 and the display device 50. The signals include an image signal Sig2 output from the information processing device 10 to the display device 50. The specific form of the coupling between the information processing device 10 and the display device 50 is not limited to coupling through the cable 55 but may be coupling through wireless communication.

As illustrated in, for example, FIGS. 2 and 3, the display device 50 includes a housing 51, the two displays 52A and 52B, an interface 53, a multi-axial sensor 54, a substrate 57, and a signal processing circuit 20, for example.

The housing 51 holds other components included in the display device 50. For example, the housing 51 holds the displays 52A and 52B arranged at a predetermined interval. In the example illustrated in FIG. 2, a partition 51a is provided between the displays 52A and 52B, but the partition 51a may be omitted.

The displays 52A and 52B are each a display panel that can be independently operated. In the first embodiment, the displays 52A and 52B are each a liquid crystal display panel including a display panel 40 and a light source 60.

The display panel 40 is controlled to be driven based on a signal from the signal processing circuit 20. The display panel 40 includes a first substrate 42, a second substrate 43, and the like. Liquid crystal that forms a liquid crystal layer, which is not illustrated, is sealed between the first substrate 42 and the second substrate 43. The light source 60 illuminates the back surface of the display panel 40. The display panel 40 displays an image by using signals from the signal processing circuit 20 and light from the light source 60.

The interface 53 is a coupling portion to which the cable 55 can be coupled. Specifically, the interface 53 is, for example, an interface as an integration of a High Definition Multimedia Interface (HDMI) (registered trademark) and a Universal Serial Bus (USB) interface. Although not illustrated, the cable 55 is bifurcated into the HDMI (registered trademark) interface and the USB interface on the information processing device 10 side.

The multi-axial sensor 54 is a sensor disposed in the display device 50 to sense motion of the display device 50. In the display system, the multi-axial sensor 54 is a sensor that can sense motion of a user when the display device 50 integrated with the VR goggles G is worn on the head of the user. The multi-axial sensor 54 and the signal processing circuit 20 are circuits provided on the substrate 57. The interface 53 is coupled to the displays 52A and 52B, the multi-axial sensor 54, and the signal processing circuit 20 through the substrate 57.

The display device 50 operates by receiving electric power supply from, for example, the information processing device 10 coupled therewith through the interface 53 but may include an own power source.

Figure 4:
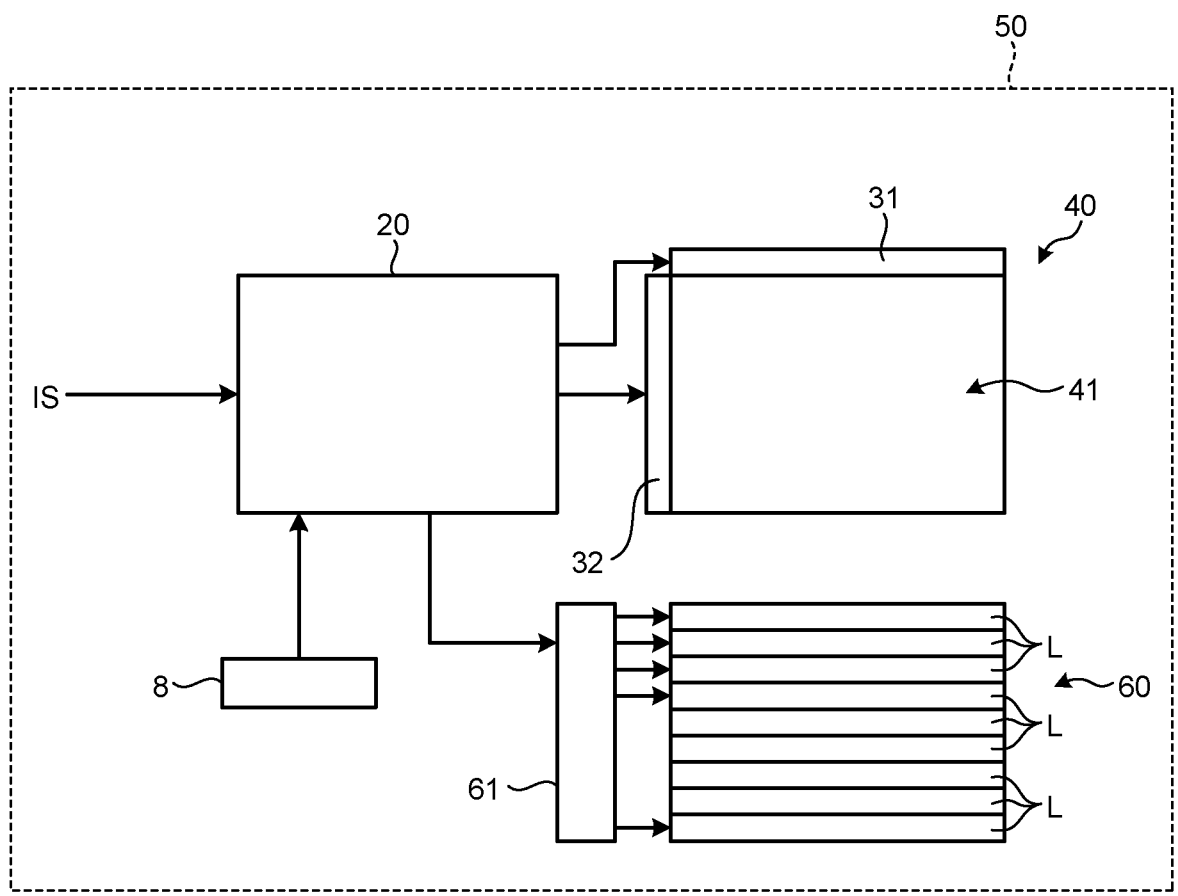
FIG. 4 is a schematic diagram illustrating an example of a block configuration of a display device according to a first embodiment.
Figure 5:
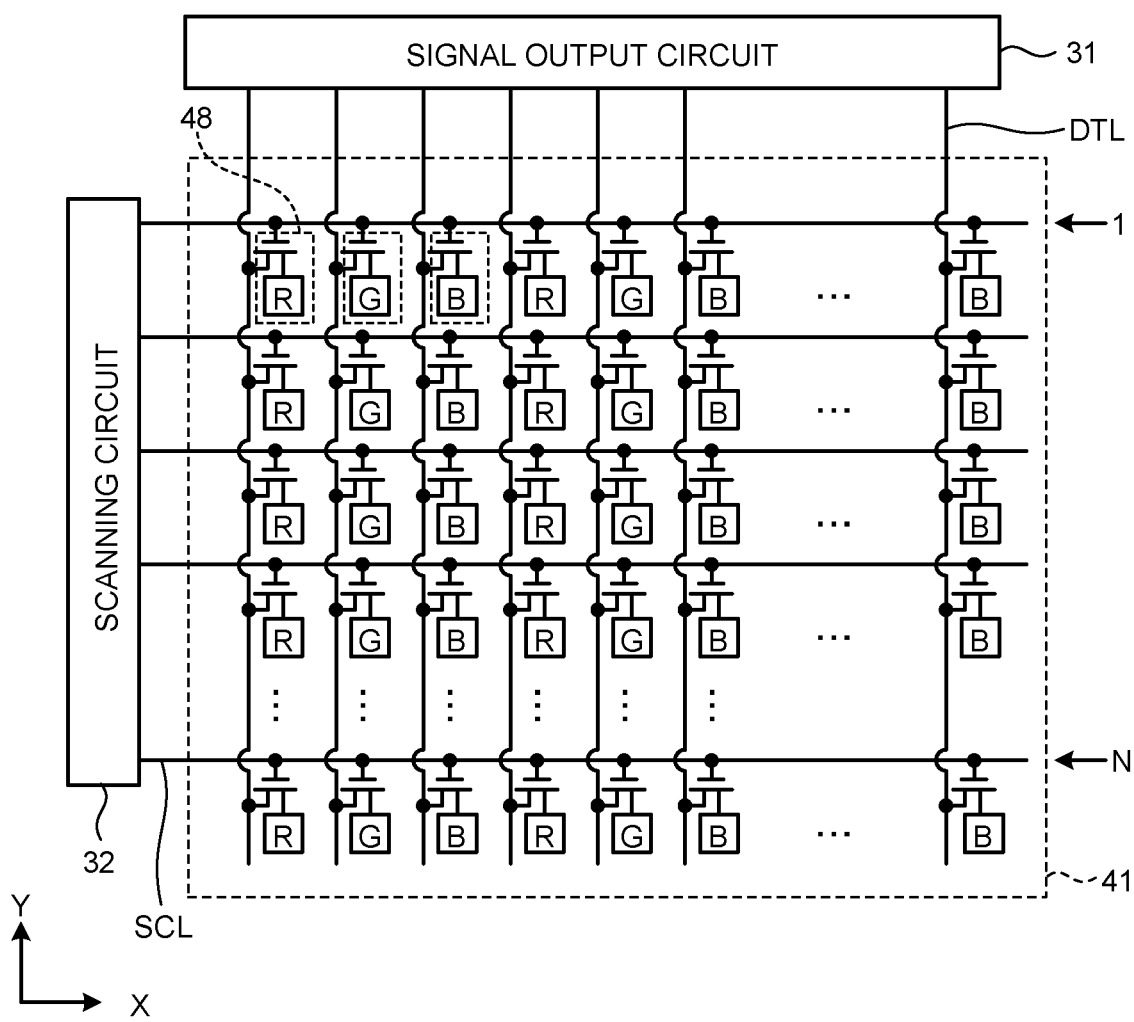
FIG. 5 is a schematic diagram illustrating an example of the configuration of a display panel according to the first embodiment.

FIG. 4 is a schematic diagram illustrating an example of a block configuration of the display device according to the first embodiment. FIG. 5 is a schematic diagram illustrating an example of the configuration of the display panel according to the first embodiment. The display device 50 according to the first embodiment includes the signal processing circuit 20, the display panel 40, and the light source 60 as main block components.

In the present disclosure, the display device 50 includes a sight line detection sensor 8. The sight line detection sensor 8 is a sensor that measures the viewpoint of a user by using an eye tracking technology. An output signal from the sight line detection sensor 8 is input to the signal processing circuit 20.

The display panel 40 is provided with a display region 41 in which a plurality of pixels 48 are arranged in an X direction (first direction) and a Y direction (second direction). In the present disclosure, the sight line detection sensor 8 only needs to have a configuration that allows at least a viewpoint in the Y direction on the display region 41 to be detected. The present disclosure is not limited by the method of sight line detection by the sight line detection sensor 8 and the specific configuration thereof.

As illustrated in FIG. 5, each pixel 48 displays, for example, a first color (for example, red (R)), a second color (for example, green (G)), and a third color (for example, blue (B)). The first color, the second color, and the third color are not limited to red, green, and blue but may be complementary colors and only need to be colors different from one another. In other words, any one of the three colors is allocated to each pixel 48. FIG. 5 exemplarily illustrates a pixel configuration of a stripe array in which the pixels 48 each configured to display the first color (for example, red (R)), the second color (for example, green (G)), and the third color (for example, blue (B)) are arranged in the X direction. Four colors or more may be allocated to the pixels 48.

The display panel 40 is, for example, a transmissive color liquid crystal display panel. A first color filter that allows light in the first color to pass, a second color filter that allows light in the second color to pass, and a third color filter that allows light in the third color to pass are arranged in the display panel 40 and each overlap a position where a pixel electrode of each pixel 48 is provided.

The orientation of liquid crystal molecules contained in the liquid crystal layer of the display panel 40 is determined in accordance with the potential of the pixel electrode. Thus, the light transmittance of each pixel 48 is controlled.

The display panel 40 includes a signal output circuit 31 and a scanning circuit 32.

The signal output circuit 31 outputs, to the display panel 40, an image signal having a predetermined potential corresponding to an image signal from the signal processing circuit 20. The signal output circuit 31 is electrically coupled to the display panel 40 through signal lines DTL.

The scanning circuit 32 performs control to turn on and off a switching element for controlling operation (light transmittance) of each pixel 48 of the display panel 40. The switching element is, for example, a thin film transistor (TFT). The scanning circuit 32 is electrically coupled to the display panel 40 through scanning lines SCL.

The scanning circuit 32 outputs a drive signal to a predetermined number of scanning lines SCL and drives pixels 48 coupled to the scanning lines SCL to each of which the drive signal is output. The switching element of each of the pixels 48 is turned on in response to the drive signal, and a potential corresponding to the image signal is transmitted to the pixel electrode and a potential holder (such as a capacitor) of the pixel 48 through the signal line DTL. The scanning circuit 32 scans the display panel 40 by shifting the scanning line SCL to which the drive signal is output.

The scanning lines SCL are arranged in the Y direction. The scanning lines SCL extend in the X direction. Each scanning line SCL is shared by pixels 48 arranged in the X direction. Thus, pixels 48 sharing the same scanning line SCL are driven at the same timing in accordance with the drive signal. In the following description, a plurality of pixels 48 arranged in the X direction are also referred to as a "pixel row". The scanning circuit 32 supplies the drive signals to scan the pixel rows arranged in the Y direction in the display region 41.

The scanning circuit 32 shifts the output target of the drive signal from a pixel row 1 to a pixel row N. Alternatively, the output target of the drive signal may be shifted from the pixel row N to the pixel row 1. The number N represents the number of scanning lines SCL in the display region 41 of the display panel 40. In other words, the total number of the pixel rows in the display region 41 of the display panel 40 is N. In the present disclosure, an example will be described below in which the output target of the drive signal is shifted from the pixel row 1 to the pixel row N.

The light source 60 is disposed on the back side of the display panel 40. The light source 60 illuminates the display panel 40 by emitting light toward the display panel 40.

As illustrated in FIG. 4, the light source 60 has a plurality of light emission regions L. The plurality of light emission regions L are arranged in the Y direction. Each light emission region L includes an individual light emitter. The light emitter is, for example, a light emitting diode (LED) but not limited thereto and only need to have a configuration in which light emission is individually controllable in each light emission region L, and may be, for example, a laser light source or the like such as a semiconductor laser configured to emit a polarized laser beam. The plurality of light emitters are coupled to a light source control circuit 61. The light source control circuit 61 controls the light emission timing, light emission time, and light emission intensity of each light emitter under operation control by the signal processing circuit 20. In other words, the signal processing circuit 20 functions as a controller that controls light emission from each of the plurality of light emission regions L. The number of the light emission regions L exemplarily illustrated in FIG. 4 does not necessarily mean the actual number of the light emission regions L but is merely schematic. Similarly, examples of the numbers of various components such as the number of pixel rows in FIG. 5 do not necessarily mean actual numbers but are merely schematic. In the present embodiment, the plurality of light emitters simultaneously emit light in a light emission period to be described later. In this case, the light source 60 may have one light emission region L that emits light to the entire surface of the display region 41 of the display panel 40.

The signal processing circuit 20 controls the display output of the display device 50 by outputting various signals for controlling operation timings of the signal output circuit 31, the scanning circuit 32, and the light source control circuit 61 in accordance with an input signal IS from the information processing device 10.

The display device 50 sequentially receives frame image signals the number of which corresponds to a frame rate as the input signal IS. The frame rate indicates the number of frame images displayed for a predetermined time (for example, for one second). The scanning of the display region 41 is periodically repeated in accordance with the frame rate, and the image signals corresponding to the frame images are provided to the pixels 48 to update the display output.

Figure 6:
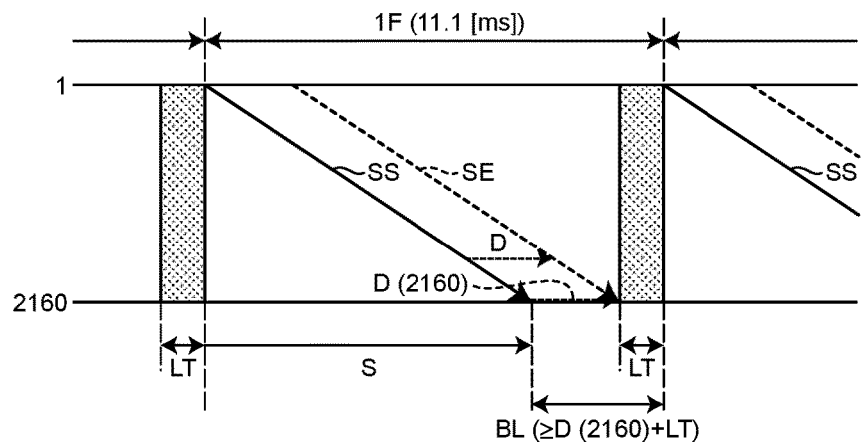
FIG. 6 is a time chart illustrating a first example of a drive period, a response period, and a light emission period of a display device according to a comparative example in one frame period.

Before description of the first embodiment, the following describes, with reference to FIG. 6, basic ideas of the relation between the drive timing of the pixels 48 in scanning by the scanning circuit 32 and the response completion timing of the pixels 48 of each pixel row and the relation between the response completion timing of the pixels 48 of each pixel row and the light emission timing of the light source 60. In the following description with reference to FIG. 6 and the subsequent diagrams, one frame period 1F is defined to be a period for providing an image signal corresponding to one frame image to each pixel 48.

Figure 7:
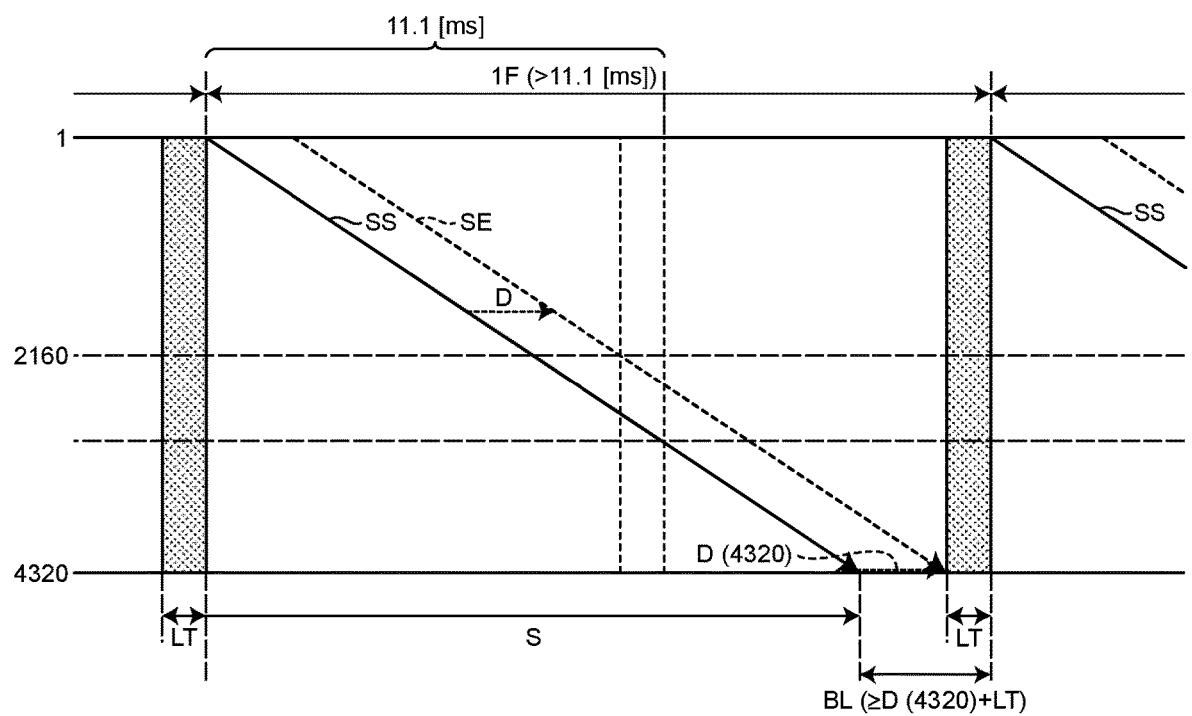
FIG. 7 is a time chart illustrating a second example of the drive period, the response period, and the light emission period of the display device according to the comparative example in one frame period.

FIG. 6 is a time chart illustrating a first example of the drive period, the response period, and the light emission period of a display device according to a comparative example in one frame period. FIG. 7 is a time chart illustrating a second example of the drive period, the response period, and the light emission period of the display device according to the comparative example in one frame period. The first example illustrated in FIG. 6 is an example in which the display panel 40 has a resolution of 4K (N=2160). The second example illustrated in FIG. 7 is an example in which the display panel 40 is a high-definition display panel having a resolution of 8K (N=4320).

In scanning by the scanning circuit 32 in the comparative example, the output target of the drive signal is sequentially shifted from the pixel row 1 to the pixel row N. In other words, the scanning circuit 32 in the comparative example sequentially supplies the drive signal to each pixel row in the entire area of the display region 41.

Liquid crystal molecules in each pixel 48 are controlled to acquire an orientation in accordance with an image signal provided at timing (hereinafter also referred to as a "drive timing SS") at which the pixel 48 is driven in accordance with the drive signal. Timing (hereinafter also referred to as a "response completion timing SE") at which operation that the liquid crystal molecules acquire the orientation corresponding to the image signal is completed is later than the drive timing SS of the pixel 48.

In the example illustrated in FIG. 6, each pixel row is driven once in one frame period 1F. In response to update of a frame image, scanning corresponding to the next frame image is performed after one frame period 1F. In the present disclosure, the period from the drive timing SS(1) of the pixel row 1 to the drive timing SS(N) of the pixel row N is referred to as a "drive period S", and the period from the drive timing SS to the response completion timing SE is referred to as a "response period D". The period from the drive timing SS(N) of the pixel row N to the drive timing SS(1) of the pixel row 1 in the next one frame period 1F is referred to as a "blanking period BL".

The response period D is a maximum response time assumed for a pixel 48 and does not individually reflect the actual time until response completion of each pixel 48.

In a case in which all light emission regions L emit light to the display panel 40 at the same timing, the light is emitted in a light emission period LT following the response period D(N) of the pixels 48 of the pixel row N after the drive period S. That is, the blanking period BL is equal to or longer than the summed period of the light emission period LT and the response period D(N) of the pixels 48 of the pixel row N (BL≥D(N)+LT).

Assume that the response period D is the same between the 4K-resolution display panel 40 illustrated in FIG. 6 and the 8K-resolution display panel 40 illustrated in FIG. 7. In a case in which the frame frequency of the 4K-resolution display panel 40 illustrated in FIG. 6 is 90 Hz, in other words, one frame period 1F is 11.1 ms, one frame period 1F of the 8K-resolution display panel 40 illustrated in FIG. 7 is longer than 11.1 ms and the frame rate thereof is lower than that of the 4K-resolution display panel 40 illustrated in FIG. 6. However, in a case where drive control of the 8K-resolution display panel 40 illustrated in FIG. 7 is performed with the same frame rate, a sufficient response period is not obtained in the region between the dashed and single-dotted line and the dashed and double-dotted line, and the drive signals are not supplied to the scanning lines SCL in the region below the dashed and double-dotted line.

The following describes a driving method that enables a driving of a high-definition display panel without decreasing the frame rate.

Figure 8A:
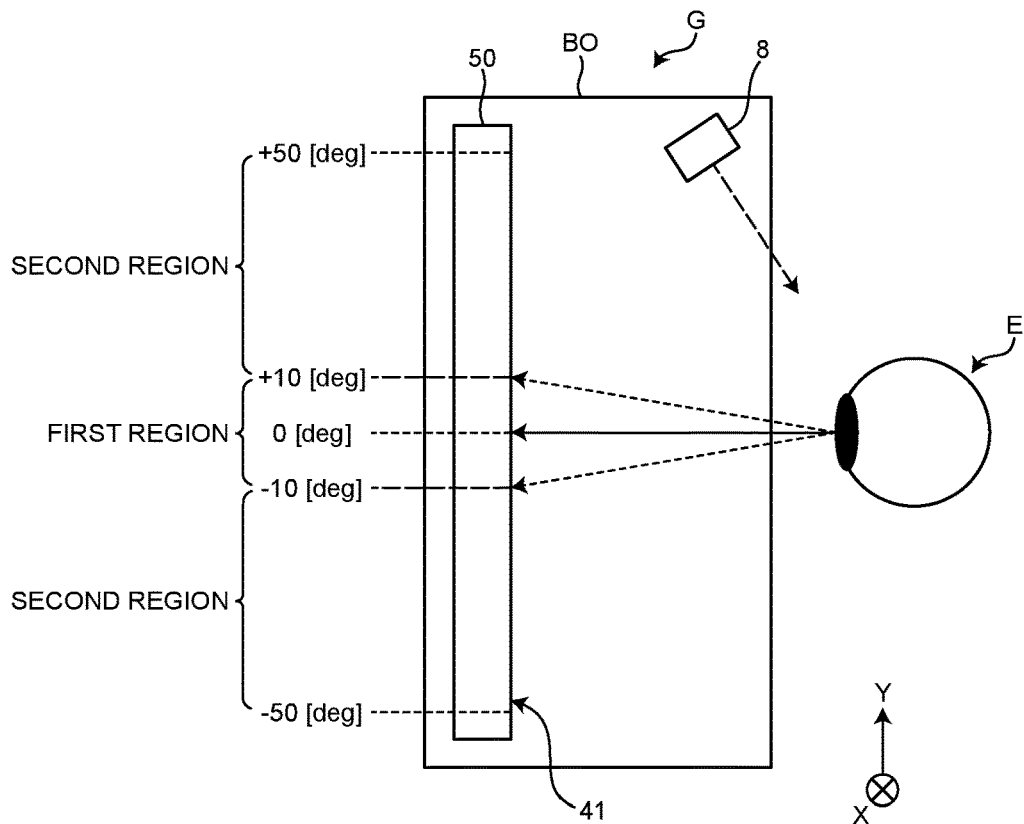
FIG. 8A is a schematic diagram illustrating an example of the relative relation between the display panel and an eye of a user.
Figure 8B:
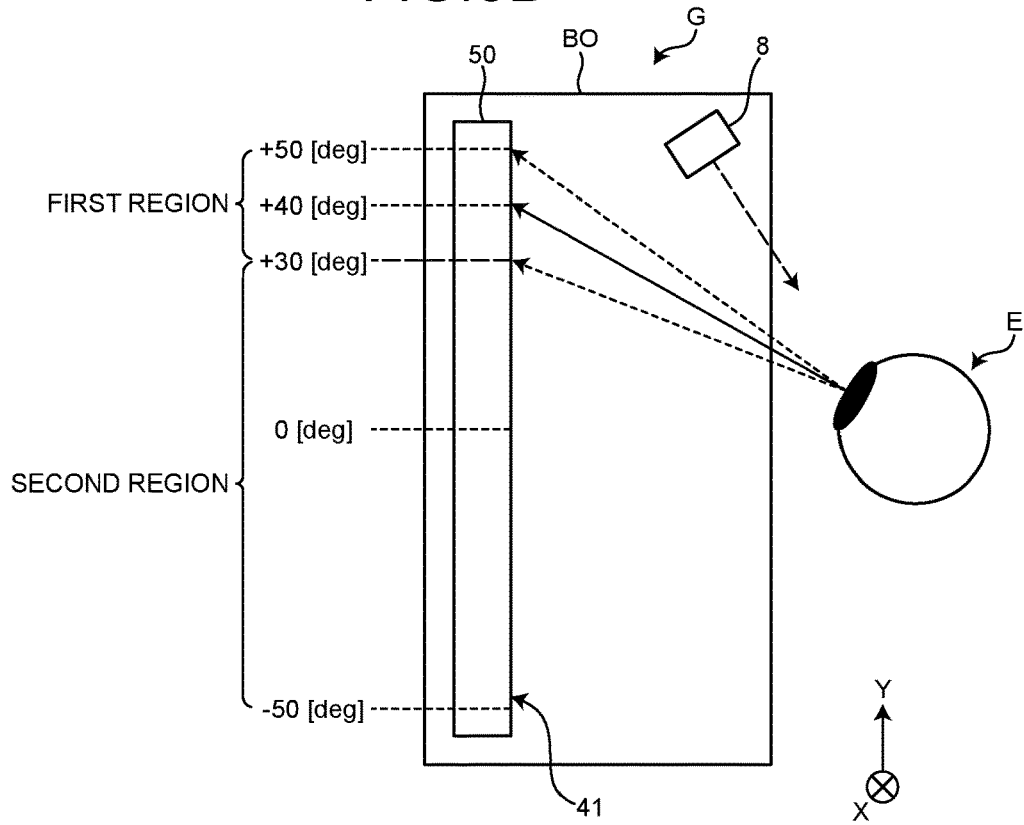
FIG. 8B is a schematic diagram illustrating another example of the relative relation between the display panel and the eye of the user.
Figure 9:
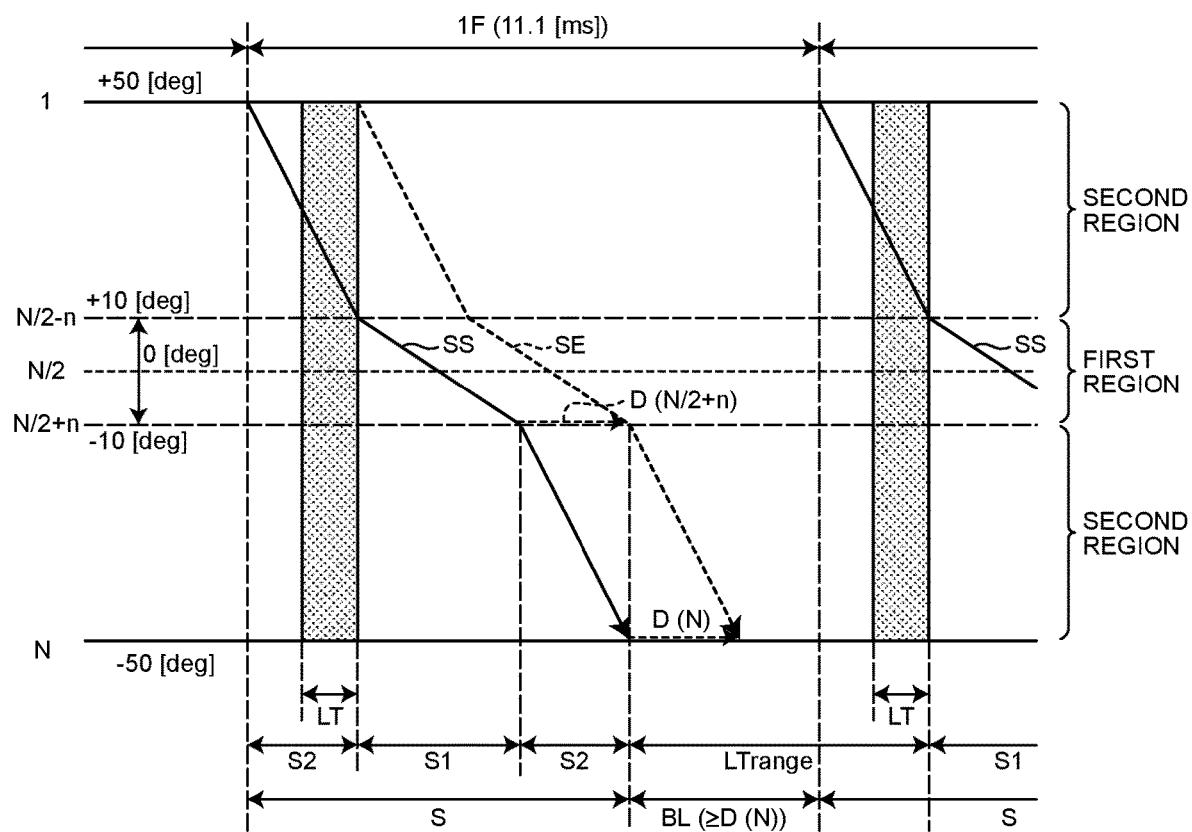
FIG. 9 is a time chart illustrating a first example of the drive period, the response period, and the light emission period of the display device according to the first embodiment in one frame period.
Figure 10:
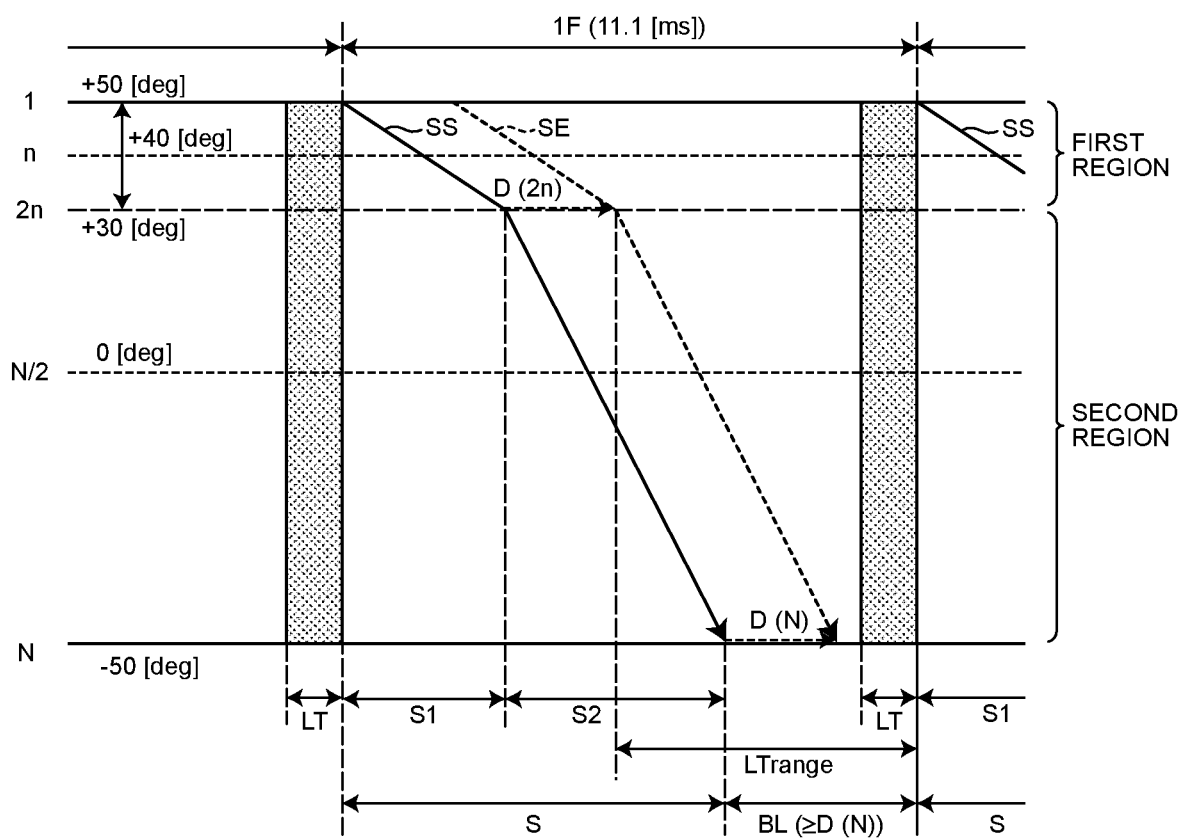
FIG. 10 is a time chart illustrating a second example of the drive period, the response period, and the light emission period of the display device according to the first embodiment in one frame period.

FIGS. 8A and 8B are schematic diagrams illustrating examples of the relative relation between the display panel and an eye of a user. FIG. 9 is a time chart illustrating a first example of the drive period, the response period, and the light emission period of the display device according to the first embodiment in one frame period. FIG. 10 is a time chart illustrating a second example of the drive period, the response period, and the light emission period of the display device according to the first embodiment in one frame period. In these examples, as in the second example of the comparative example illustrated in FIG. 7, the display panel 40 is a high-definition display panel having a resolution of 8K (N=4320).

When the VR goggles G are mounted on a user, an image displayed on the display panel 40 is formed on the retina of an eye E of the user through a lens (not illustrated). In the present disclosure, a view angle in the Y direction on the display region 41 of the display device 50 is +50 degrees (hereinafter referred to as "deg") on the upper side (in the positive direction) and −50 deg on the lower side (in the negative direction) with respect to 0 deg at the central position of the display region 41 in the Y direction.

The sight line detection sensor 8 is disposed, for example, in a housing BO of the VR goggles G and traces the viewpoint of the eye E of the user in the Y direction. In the present disclosure, a predetermined region including the position of the viewpoint in the Y direction on the display region 41 of the display device 50 is referred to as a first region. In the first region, the pixel rows are sequentially scanned (line-sequential scanning). In a second region outside the first region, two or more pixel rows consecutively arranged in the Y direction are simultaneously scanned (multiple-line simultaneous scanning).

For example, in a case where the detection position of the viewpoint in the Y direction on the display region 41 is the position of 0 deg in the Y direction on the display region 41 as illustrated in FIGS. 8A and 9, a region between the position of +10 deg on the upper side (in the positive direction) and the position of −10 deg on the lower side (in the negative direction) with respect to the center at the position of 0 deg in the Y direction on the display region 41 is set as the first region; and a region higher than the position of +10 deg on the upper side (in the positive direction) and a region lower than the position of −10 deg on the lower side (in the negative direction) with respect to the center at the position of 0 deg in the Y direction on the display region 41 are each set as the second region.

In the example illustrated in FIG. 9, the drive signals are sequentially supplied to the scanning lines SCL of the pixel row "N/2−n" to the pixel row "N/2+n" in the first region, and the drive signals are supplied to the scanning lines SCL of the pixel row 1 to the pixel row "N/2 −n−1" and the pixel row "N/2+n+1" to the pixel row N in the second region such that the drive signals are supplied to three scanning lines SCL at a time. In the present disclosure, the total number of pixel rows in the first region is 2n.

For example, in a case where the detection position of the viewpoint in the Y direction on the display region 41 is the position of +40 deg in the Y direction on the display region 41 as illustrated in FIGS. 8B and 10, a region between the position of +50 deg on the upper side (in the positive direction) and the position of +30 deg on the upper side (in the positive direction) with respect to the center at the position of +40 deg in the Y direction on the display region 41 is set as the first region; and a region lower than the position of +30 deg on the upper side (in the positive direction) with respect to the center at the position of +40 deg in the Y direction on the display region 41 is set as the second region.

In the example illustrated in FIG. 10, the drive signals are sequentially supplied to the scanning lines SCL of the pixel row 1 to the pixel row 2n in the first region, and the drive signals are supplied to the scanning lines SCL of the pixel row "2n+1" to the pixel row N in the second region such that the drive signals are supplied to three scanning lines SCL at a time.

In this manner, in the present disclosure, the display region 41 is divided into a plurality of regions in the Y direction, and the resolution in the Y direction is changed for each divided region. More specifically, the first region is a region including the detection position of the viewpoint on the display region 41 and including two or more pixel rows consecutively arranged in the Y direction, and the second region is a region except for the first region. One frame period 1F in which one screen is displayed in the display region 41 includes a drive period S1 (first drive period) in which the pixel rows included in the first region are sequentially scanned and a drive period S2 (second drive period) in which multiple pixel rows consecutively arranged in the Y direction in the second region are simultaneously scanned. Thus, for example, in the example illustrated in FIGS. 9 and 10, the drive period S2 (second drive period) of the second region is ⅓ of that in a case where the drive signals are sequentially supplied to the scanning lines SCL of the respective pixel rows, and the entire drive period S in one frame period 1F is shortened as compared to the second example of the comparative example illustrated in FIG. 7. As a result, it is possible to perform image display in the entire area of the display region 41 without decreasing the frame rate.

Visual resolution and the degree of color identification are high near the viewpoint of the user and decrease with distance from the viewpoint. In the present disclosure, image display in the second region is low-definition display in which the resolution in the Y direction is lower than the original resolution of the display panel 40, but as described above, since the first region is a predetermined region including the viewpoint position in the Y direction on the display region 41 of the display device 50 and the scanning lines SCL of the pixel rows in the first region are sequentially scanned, high-definition display is maintained in the first region in which the degree of identification is high.

In the present disclosure, a light emission allowable period LTrange allowed as the light emission period LT of the light source 60 is a period from completion timing of the response period of the pixels 48 included in the first region, more specifically, the response period D (the response period D(N/2+n) of the pixel row "N/2+n" in FIG. 9 or the response period D(2n) of the pixel row 2n in FIG. 10) of the pixel row at the lower end of the first region (the pixel row "N/2+n" in FIG. 9 or the pixel row 2n in FIG. 10) to start timing of the drive period S1 (first drive period) of the first region in the next frame. Consequently, the light emission period LT does not overlap the drive period S1 of the first region in the next frame. Thus, it is possible to reduce occurrence of blurring of a moving image in the first region in which the degree of visual identification is high.

In the example illustrated in FIGS. 9 and 10, the drive period S1 (first drive period) of the first region is provided immediately after the light emission period LT of the light source 60. In this case, the light emission period LT of the light source 60 and the drive period S of the next frame overlap each other in the second region in the example illustrated in FIG. 9. Consequently, blurring of a moving image occurs in the second region but is allowed since the degree of visual identification is low in the second region as described above.

First Modification

Figure 11:
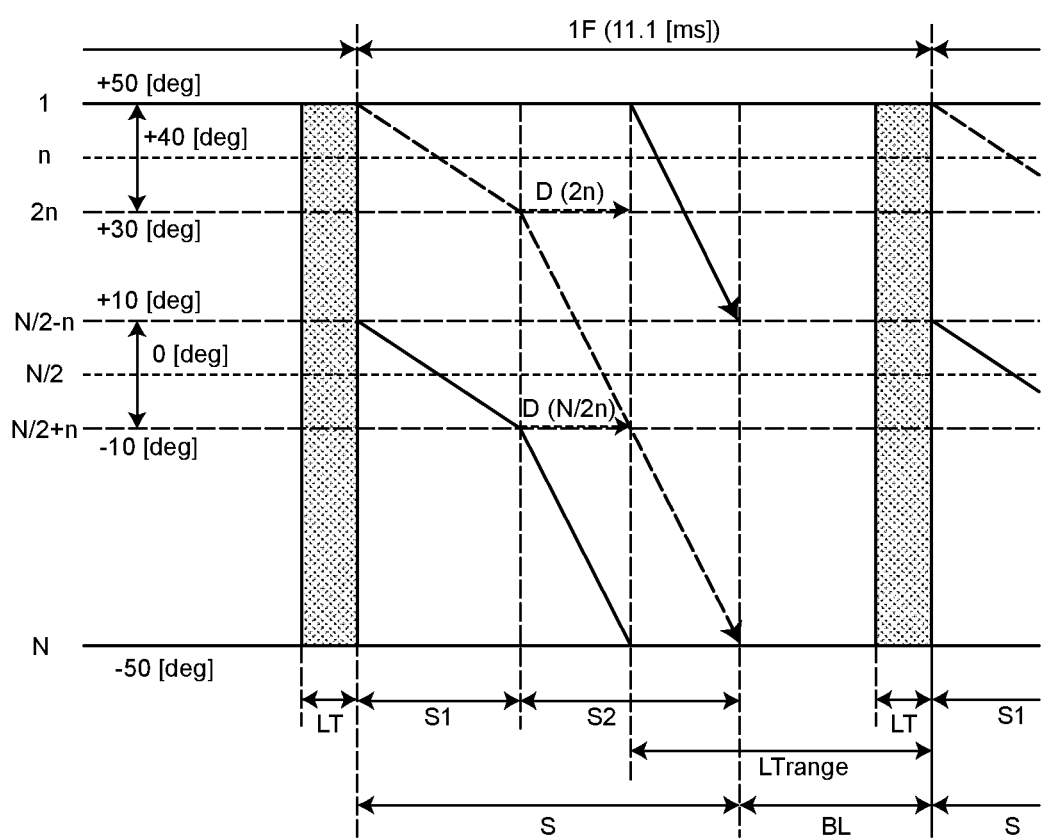
FIG. 11 is a time chart illustrating an example of the drive period, the response period, and the light emission period of a display device according to a first modification of the first embodiment in one frame period.

FIG. 11 is a time chart illustrating an example of the drive period, the response period, and the light emission period of a display device according to a first modification of the first embodiment in one frame period. In this example, as in the second example of the comparative example illustrated in FIG. 7, the display panel 40 is a high-definition display panel having a resolution of 8K (N=4320).

In the first embodiment, as illustrated in FIGS. 9 and 10, difference occurs between relative times of the drive period S and the light emission period LT depending on the viewpoint in the Y direction on the display region 41, and as a result, difference occurs between relative times of the blanking period BL and the light emission period LT. This potentially provides disadvantage to operation timing control of the scanning circuit 32 and the light source control circuit 61 in the signal processing circuit 20.

In the first modification of the first embodiment illustrated in FIG. 11, start timing of the drive period S1 (first drive period) of the first region relative to the light emission period LT is substantially constant irrespective of the viewpoint in the Y direction on the display region 41, and moreover, the drive period S2 (second drive period) of the second region is provided immediately after the drive period S1 of the first region, and the blanking period BL provided between the drive period S2 of the second region and the drive period S1 of the first region in the next frame is substantially constant irrespective of the viewpoint position in the Y direction on the display region 41. Consequently, no relative time difference due to the relative time difference between the drive period S and the light emission period LT occurs between the blanking period BL and the light emission period LT, and operation timing control of the scanning circuit 32 and the light source control circuit 61 in the signal processing circuit 20 can be easily performed.

Second Modification

Figure 12:
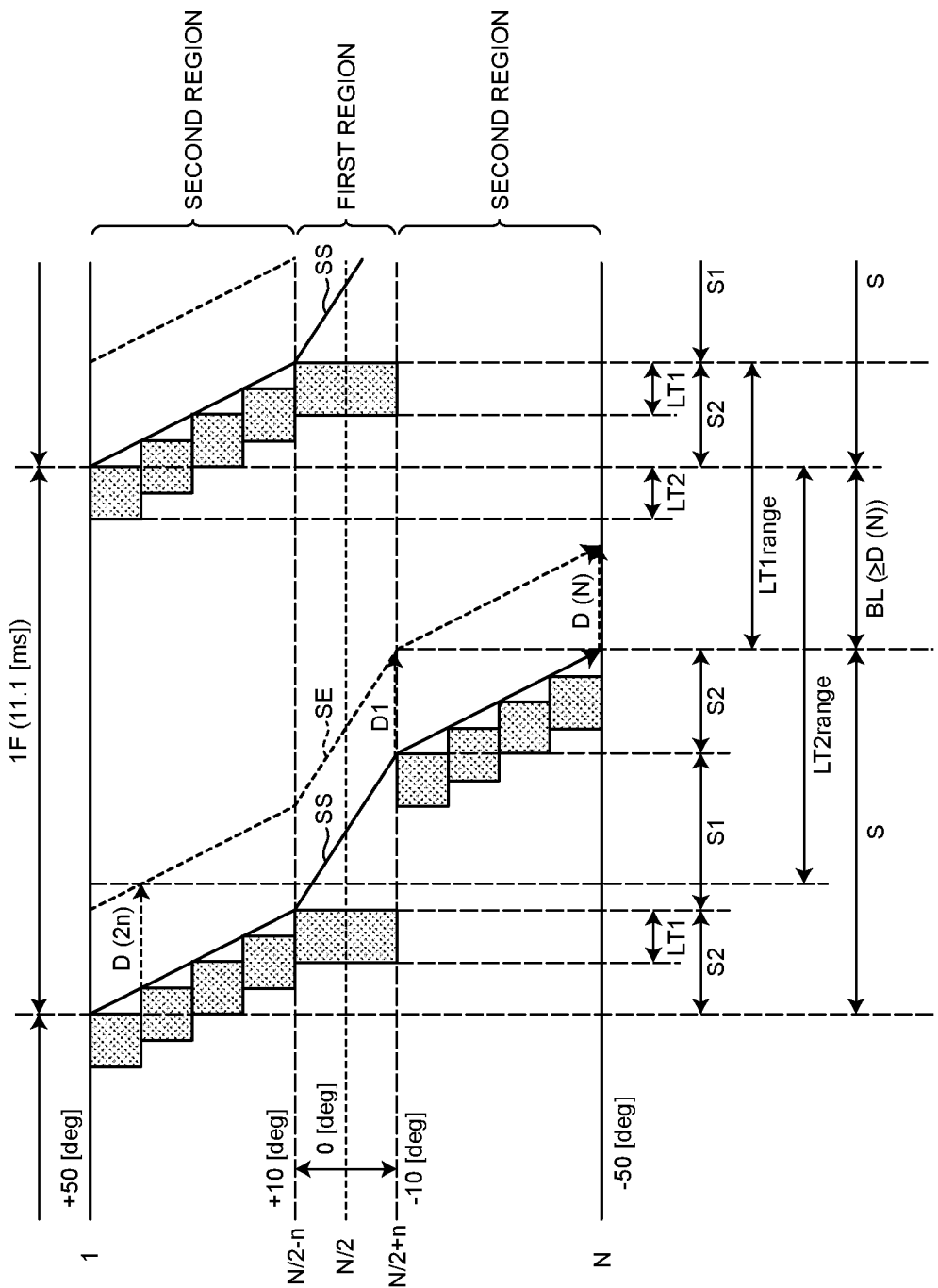
FIG. 12 is a time chart illustrating an example of the drive period, the response period, and the light emission period of a display device according to a second modification of the first embodiment in one frame period.

FIG. 12 is a time chart illustrating an example of the drive period, the response period, and the light emission period of a display device according to a second modification of the first embodiment in one frame period. In this example, as in the second example of the comparative example illustrated in FIG. 7, the display panel 40 is a high-definition display panel having a resolution of 8K (N=4320).

In the second modification of the first embodiment illustrated in FIG. 12, the light emission periods of the plurality of light emission regions L arranged in the Y direction are staggered.

In the example illustrated in FIG. 12, the drive period S1 (first drive period) of the first region is provided immediately after a light emission period LT1 of a light emission region L overlapping the first region. The present disclosure is not limited to this configuration, but in the second modification of the first embodiment, a light emission allowable period LT1range allowed as the light emission period LT1 of the light emission region L overlapping the first region is in a period from completion timing of a response period D1 of the pixel row at the lower end of the first region to start timing of the drive period S1 of the first region in the next frame. Consequently, the light emission period LT1 of the first region does not overlap the drive period S1 of the first region in the next frame. Thus, as in the first embodiment, it is possible to reduce occurrence of blurring of a moving image in the first region in which the degree of visual identification is high.

In the example illustrated in FIG. 12, the drive period S2 (second drive period) of the second region is provided immediately after a light emission period LT2 of a light emission region L overlapping the second region. The present disclosure is not limited to this configuration, but in the second modification of the first embodiment, a light emission allowable period LT2range allowed as the light emission period LT2 of the light emission region L overlapping the second region is in a period from completion timing of a response period D2 of the pixel row at the lower end of the second region to start timing of the drive period S2 of the second region in the next frame. Consequently, the light emission period LT2 of the second region does not overlap the drive period S2 of the second region in the next frame. Thus, it is possible to reduce blurring of a moving image in the second region in which the degree of visual identification is lower than in the first region.

Third Modification

Figure 13:
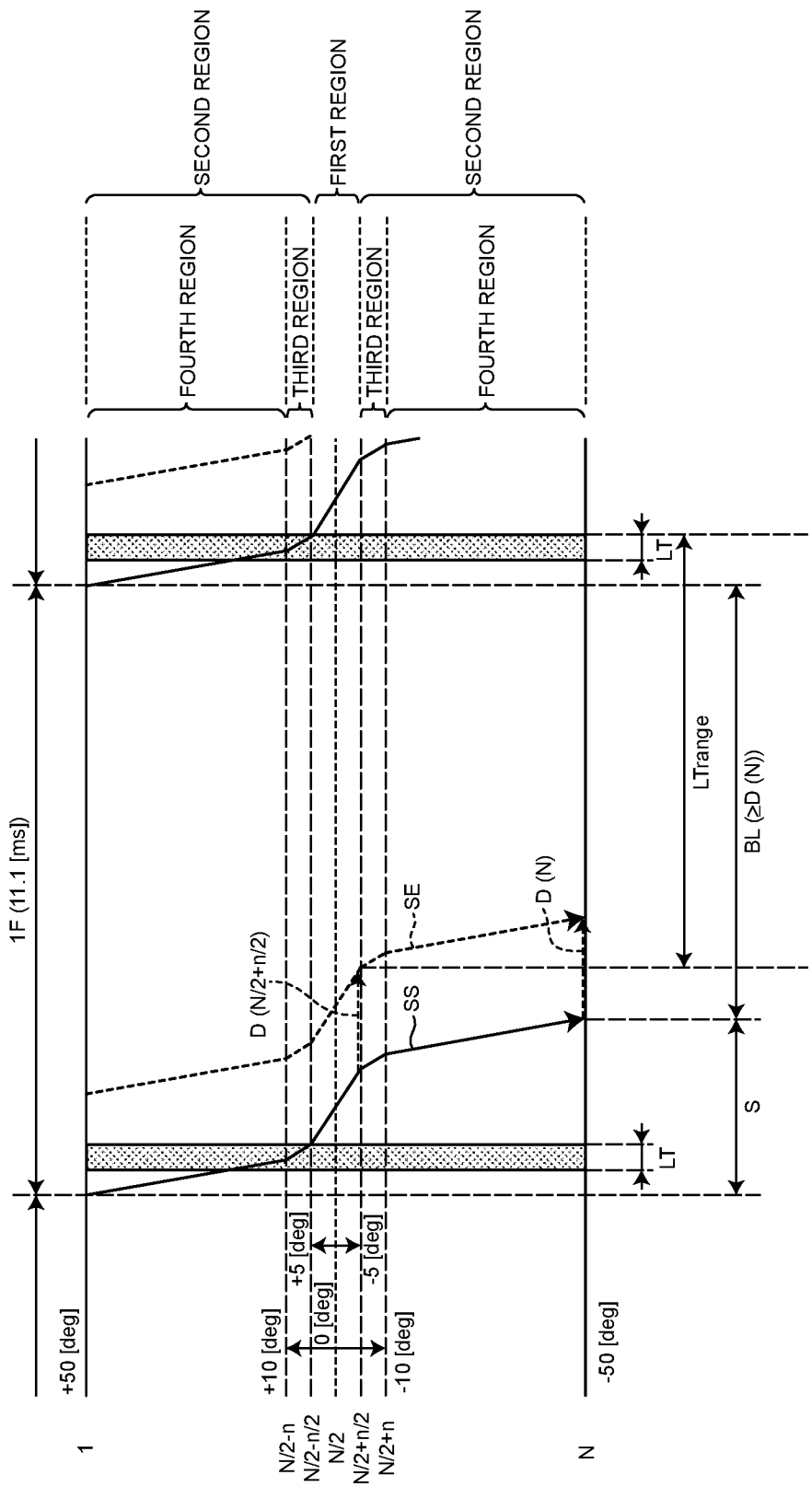
FIG. 13 is a time chart illustrating an example of the drive period, the response period, and the light emission period of a display device according to a third modification of the first embodiment in one frame period.

FIG. 13 is a time chart illustrating an example of the drive period, the response period, and the light emission period of a display device according to a third modification of the first embodiment in one frame period. In this example, as in the second example of the comparative example illustrated in FIG. 7, the display panel 40 is a high-definition display panel having a resolution of 8K (N=4320).

In the third modification of the first embodiment illustrated in FIG. 13, the second region includes a third region contacting the first region, and a fourth region except for the third region. The number of pixel rows simultaneously scanned in the third region is smaller than the number of pixel rows simultaneously scanned in the fourth region.

In the third modification of the first embodiment illustrated in FIG. 13, in a case where the detection position of the viewpoint in the Y direction on the display region 41 is the position of 0 deg in the Y direction on the display region 41, a region between the position of +5 deg on the upper side (in the positive direction) and the position of −5 deg on the lower side (in the negative direction) with respect to the center at the position of 0 deg in the Y direction on the display region 41 is set as the first region; and a region higher than the position of +10 deg on the upper side (in the positive direction) and a region lower than the position of −10 deg on the lower side (in the negative direction) with respect to the center at the position of 0 deg in the Y direction on the display region 41 are each set as the second region.

In addition, in the third modification of the first embodiment, a region between the position of +10 deg on the upper side (in the positive direction) and the position of +5 deg on the upper side (in the positive direction) and a region between the position of −5 deg on the lower side (in the negative direction) and the position of −10 deg on the lower side (in the negative direction) are each set as the third region; and a region higher than the position of +10 deg on the upper side (in the positive direction) and a region lower than the position of −10 deg on the lower side (in the negative direction) are each set as the fourth region.

The drive signals are sequentially supplied to the scanning lines SCL of the pixel row "N/2−n/2" to the pixel row "N/2+n/2" in the first region. The drive signals are supplied to the scanning lines SCL of the pixel row "N/2−n+1" to the pixel row "N/2−n/2−1" and the pixel row "N/2+n/2+1" to the pixel row "N/2+n−1" in the third region such that the drive signals are supplied to three scanning lines SCL at a time. The drive signals are supplied to the scanning lines SCL of the pixel row 1 to the pixel row "N/2−n−1" and the pixel row "N/2+n+1" to the pixel row N in the fourth region such that the drive signals are supplied to 10 scanning lines SCL at a time.

Consequently, the drive period of the third region is ⅓ of that in a case where the drive signals are sequentially supplied to the scanning lines SCL of the respective pixel rows, and the drive period of the fourth region is 1/10 of that in a case where the drive signals are sequentially supplied to the scanning lines SCL of the respective pixel rows. Thus, the entire drive period S in one frame period is further shortened as compared to the first embodiment. As a result, for example, the light emission allowable period LTrange allowed as the light emission period LT of the light source 60 and the blanking period BL are longer than in the first embodiment. Alternatively, the frame rate can be higher than in the first embodiment.

Second Embodiment

Figure 14:
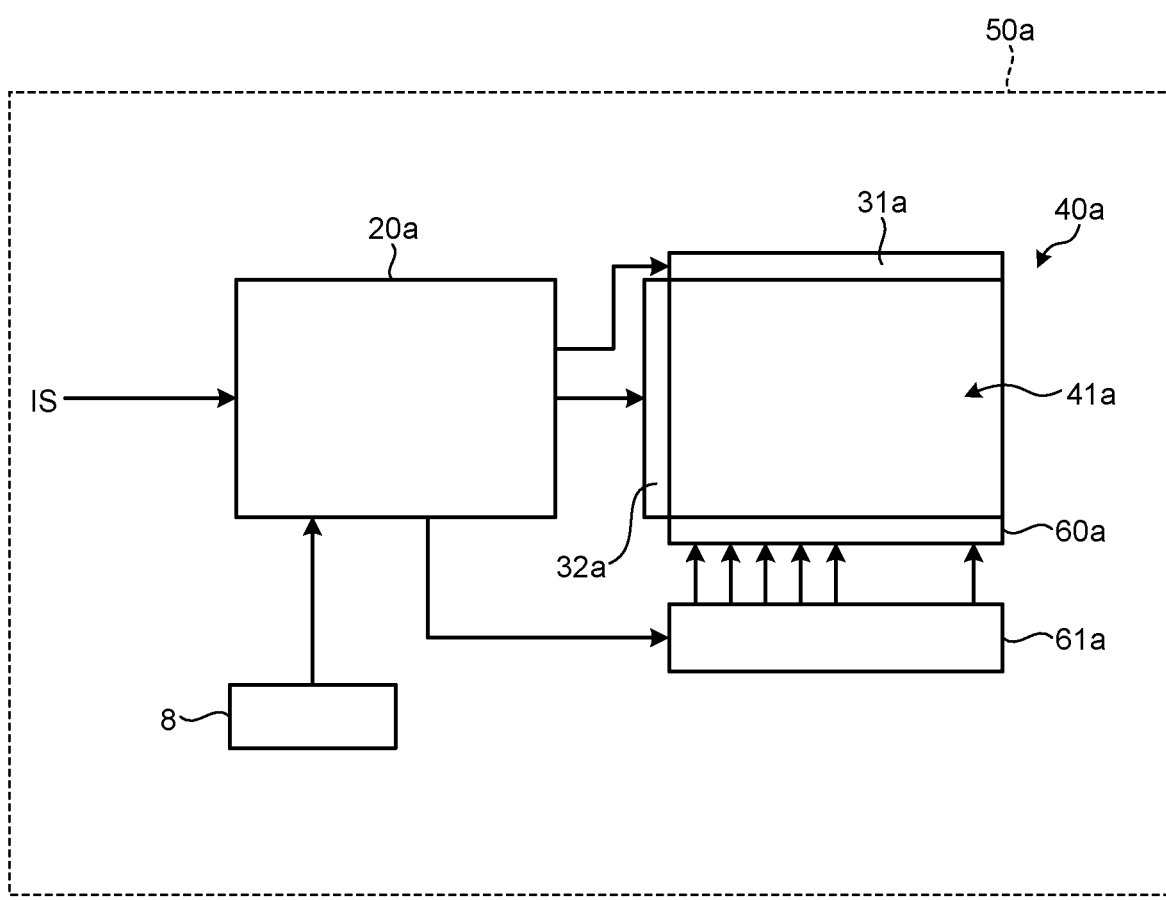
FIG. 14 is a schematic diagram illustrating an example of a block configuration of a display device according to a second embodiment.
Figure 15:
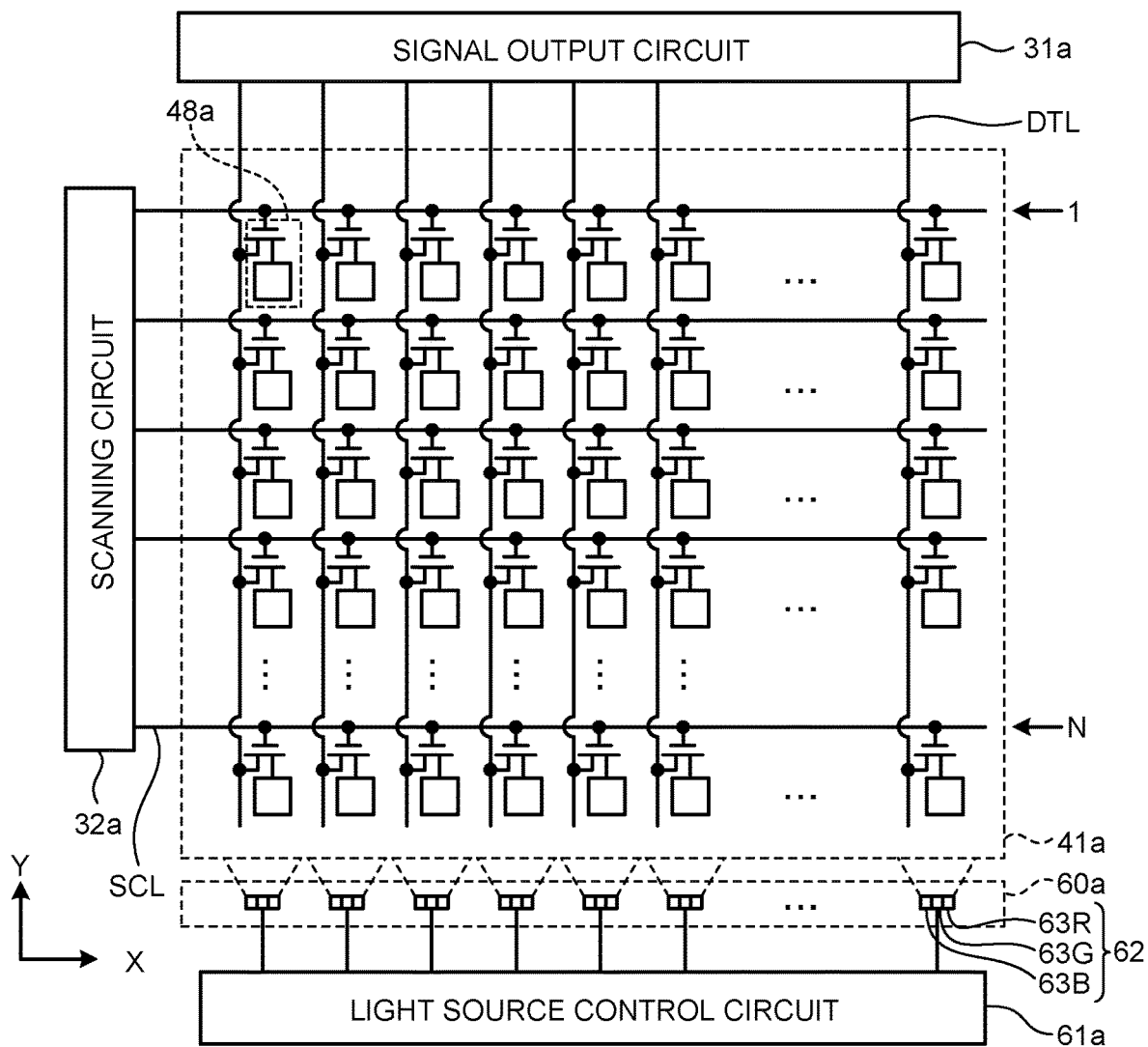
FIG. 15 is a schematic diagram illustrating an example of the configuration of a display panel according to the second embodiment.

FIG. 14 is a schematic diagram illustrating an example of a block configuration of a display device according to a second embodiment. FIG. 15 is a schematic diagram illustrating an example of the configuration of a display panel according to the second embodiment. A display device 50a according to the second embodiment includes a signal processing circuit 20a, a display panel 40a, and a light source 60a as main block components. In the display device 50a according to the second embodiment, the display panel 40a is, for example, an active-matrix color liquid crystal display panel driven by a field sequential system.

The signal processing circuit 20a controls the display output of the display device 50a by outputting various signals for controlling operation of a signal output circuit 31a, a scanning circuit 32a, and a light source control circuit 61a in accordance with an input signal IS from the information processing device 10.

In the display device 50a according to the second embodiment, the light source 60a includes a plurality of light emitting units 62. The light source 60a is coupled to the light source control circuit 61a. The light source 60a is called a side light source, and for example, light emitted from the light source 60a propagates inside a substrate included in the display panel 40a, is scattered at pixels 48a including liquid crystal in a scattering state, and is radiated to the outside of the substrate.

Each light emitting unit 62 includes a light emitter 63R of a first color (for example, red), a light emitter 63G of a second color (for example, green), and a light emitter 63B of a third color (for example, blue). The light source control circuit 61a controls each of the light emitter 63R of the first color, the light emitter 63G of the second color, and the light emitter 63B of the third color to emit light in a time divisional manner based on a light source control signal from the signal processing circuit 20a. Thus, the light emitter 63R of the first color, the light emitter 63G of the second color, and the light emitter 63B of the third color are driven by the field sequential system. The light source control signal is, for example, a signal including information on the light quantity of the light emitting unit 62, which is set in accordance with an input gradation value to a pixel 48a. For example, the light quantity of the light emitting unit 62 is set to be small in a case where a dark image is displayed. The light quantity of the light emitting units 62 is set to be large in a case where a bright image is displayed.

In the configuration including the display panel 40 of a color filter system described above in the first embodiment, the first color filter that allows light in the first color to pass, the second color filter that allows light in the second color to pass, and the third color filter that allows light in the third color to pass are provided such that each color filter overlaps the pixel electrode of each pixel 48, and the pixels that display the first color, the second color, and the third color are simultaneously driven in one frame period 1F to display a color image, but in the display panel 40a of the field sequential system, the pixels 48a are driven in a time divisional manner in one frame period 1F to display images in the first color, the second color, and the third color in one frame period 1F. Since human eyes have limitation on time-related resolution and an afterimage occurs, a composed image of the three colors is recognized in one frame period 1F. Images in a first color, a second color, a third color, and a fourth color may be displayed in one frame period 1F.

Figure 16:
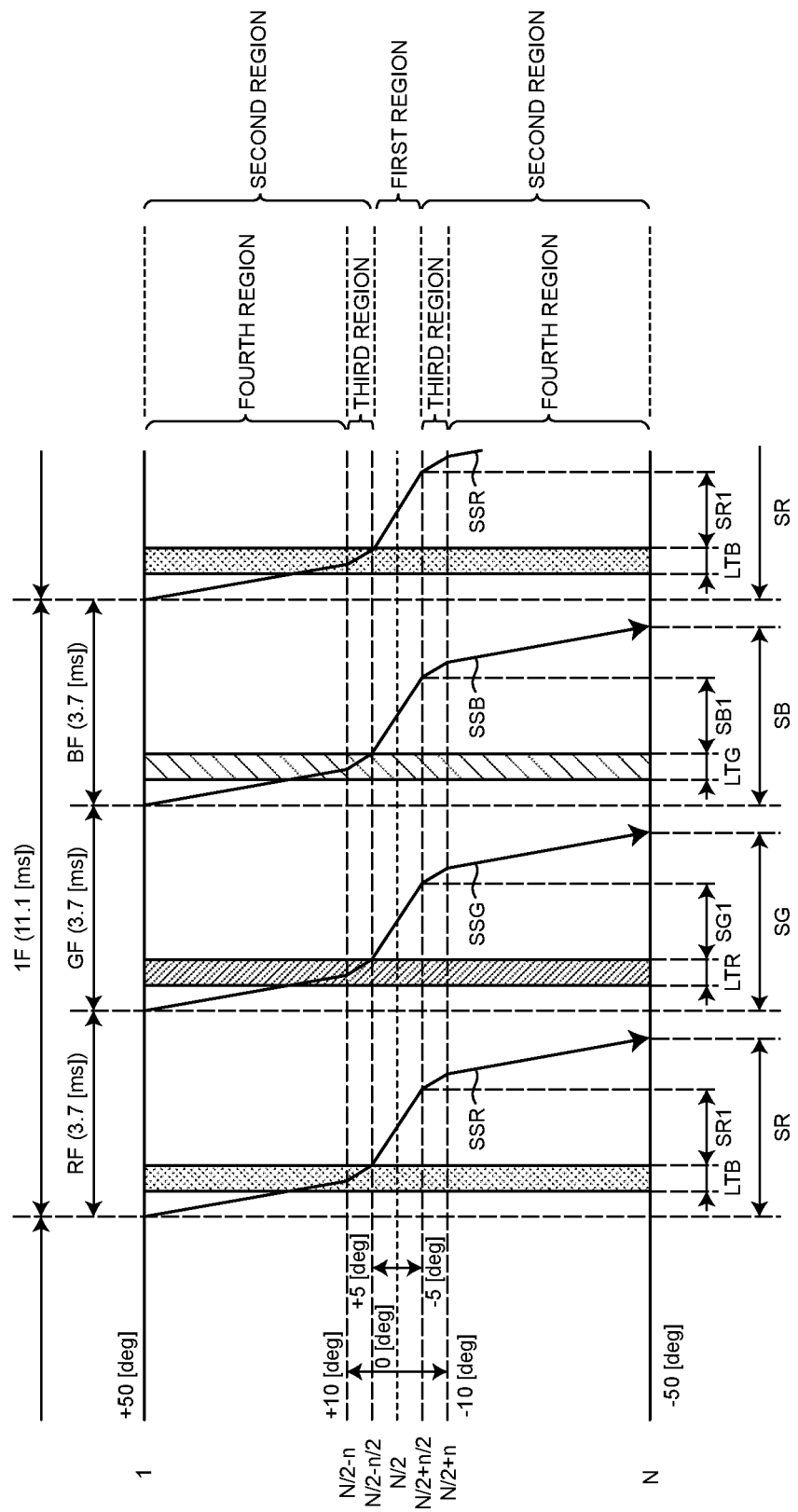
FIG. 16 is a time chart illustrating an example of division of one frame period in the display device according to the second embodiment.

FIG. 16 is a time chart illustrating an example of division of one frame period of the display device according to the second embodiment. In the present disclosure, the following describes an example in which one frame period 1F is divided into three and images in the first color (for example, red), the second color (for example, green), and the third color (for example, blue) are displayed. In this example, as in the second example of the comparative example illustrated in FIG. 7, the display panel 40a is a high-definition display panel having a resolution of 8K (N=4320).

As illustrated in FIG. 16, with the display device 50a of the field sequential system according to the second embodiment, one frame period 1F is equally divided into three, namely, a first subframe period RF, a second subframe period GF, and a third subframe period BF. Specifically, in a case where one frame period 1F is 11.1 ms, the first subframe period RF, the second subframe period GF, and the third subframe period BF are each 3.7 ms.

A drive period SR for the first color is provided in the first subframe period RF, a drive period SG for the second color is provided in the second subframe period GF, and a drive period SB for the third color is provided in the third subframe period BF.

In the second embodiment illustrated in FIG. 16, as in the third modification of the first embodiment, in a case where the detection position of the viewpoint in the Y direction on the display region 41 is the position of 0 deg in the Y direction on the display region 41, is a region between the position of +5 deg on the upper side (in the positive direction) and the position of −5 deg on the lower side (in the negative direction) with respect to the center at the position of 0 deg in the Y direction on the display region 41 is set as the first region, and a region higher than the position of +10 deg on the upper side (in the positive direction) and a region lower than the position of −10 deg on the lower side (in the negative direction) with respect to the center at the position of 0 deg in the Y direction on the display region 41 are each set as the second region.

In addition, a region between the position of +10 deg on the upper side (in the positive direction) and the position of +5 deg on the upper side (in the positive direction) and a region between the position of −5 deg on the lower side (in the negative direction) and the position of −10 deg on the lower side (in the negative direction) are each set as the third region.

In the first subframe period RF, the second subframe period GF, and the third subframe period BF, the drive signals are sequentially supplied to scanning lines SCL of the pixel row "N/2−n/2" to the pixel row "N/2+n/2" in the first region. In the first subframe period RF, the second subframe period GF, and the third subframe period BF, the drive signals are supplied to the scanning lines SCL of the pixel row 1 to the pixel row "N/2−n−1" and the pixel row "N/2+n+1" to the pixel row N in the second region such that the drive signals are supplied to 10 scanning lines SCL at a time. Consequently, the drive period of the second region in the first subframe period RF, the second subframe period GF, and the third subframe period BF is 1/10 of that in a case where drive signals are sequentially supplied to scanning lines SCL of each pixel row.

In the first subframe period RF, the second subframe period GF, and the third subframe period BF, the drive signals are supplied to the scanning lines SCL of the pixel row "N/2−n+1" to the pixel row "N/2−n/2−1" and the pixel row "N/2+n/2+1" to the pixel row "N/2+n−1" in the third region such that the drive signals are supplied to three scanning lines SCL at a time. Consequently, the drive period of the third region in the first subframe period RF, the second subframe period GF, and the third subframe period BF is 1/3 of that in a case where the drive signals are sequentially supplied to the scanning lines SCL of the respective pixel rows.

In the present disclosure, a light emission allowable period allowed as a light emission period LTR of the light emitter 63R of the light source 60a is in a period from completion timing of the response period of the pixel row at the lower end of the first region (the pixel row "N/2+n/2" in FIG. 16) in the first subframe period RF to start timing of a drive period SG1 (first drive period) of the first region in the next frame (second subframe period GF). A light emission allowable period allowed as a light emission period LTG of the light emitter 63G of the light source 60a is in a period from completion timing of the response period of the pixel row at the lower end of the first region (the pixel row "N/2+n/2" in FIG. 16) in the second subframe period GF to start timing of a drive period SB1 (first drive period) of the first region in the next frame (third subframe period BF). A light emission allowable period allowed as a light emission period LTB of the light emitter 63B of the light source 60a is a period from completion timing of the response period of the pixel row at the lower end of the first region (the pixel row "N/2+n/2" in FIG. 16) in the third subframe period BF to start timing of a drive period SR1 (first drive period) of the first region in the next frame (first subframe period RF). Thus, it is possible to reduce occurrence of color blurring of a moving image in the first region in which the degree of visual identification is high.

In the example illustrated in FIG. 16, the light emission period LTB and the drive period SR of the first subframe period RF overlap each other in the second region in the first subframe period RF. The light emission period LTR and the drive period SG of the second subframe period GF overlap each other in the second region in the second subframe period GF. The light emission period LTG and the drive period SB of the third subframe period BF overlap each other in the second region in the third subframe period BF. Thus, color blurring of a moving image occurs in the second region but is allowed since the degree of visual identification is low in the second region as described above in the first embodiment.

In the second embodiment as well, start timings of the drive periods SR1, SG1, and SB1 (first drive periods) of the first region relative to the light emission periods LTR, LTG, and LTB in the respective subframe periods are substantially constant irrespective of the viewpoint in the Y direction on the display region 41; the drive period (second drive period) of the second region is provided immediately after the drive period of the first region; and the blanking period BL provided between the drive period of the second region and the drive period of the first region in the next subframe is substantially constant irrespective of the viewpoint position in the Y direction on the display region 41. Thus, no relative time difference occurs between the blanking period BL and each of the light emission periods LTR, LTG, and LTB due to the relative time difference between the drive period SR and the light emission period LTR, the relative time difference between the drive period SG and the light emission period LTG, or the relative time difference between the drive period SB and the light emission period LTB; and operation timing control of the scanning circuit 32a and the light source control circuit 61a in the signal processing circuit 20a can be easily performed.

Each embodiment above describes an example in which the pixel rows included in the first region in the display region 41 (41a) are sequentially scanned and the two or more pixel rows consecutively arranged in the Y direction in the second region are simultaneously scanned, but the present disclosure is not limited to this configuration. For example, the pixel rows included in the first region in the display region 41 (41a) may be sequentially scanned, and two or more pixel rows in the second region may be scanned in a skipping manner.

Each embodiment above describes an example in which a region including the viewpoint position in the Y direction on the display region 41 or 41*a*, which is measured by the sight line detection sensor 8, is set as the first region, and the pixel rows in the first region are sequentially scanned, but the present disclosure is not limited to this configuration. A region including a predetermined position (for example, the central position) in the Y direction on the display region 41 or 41*a* may be set as the first region. In this case, the sight line detection sensor 8 does not necessarily need to be provided.

Preferable embodiments of the present disclosure are described above, but the present disclosure is not limited to such embodiments. Contents disclosed in the embodiments are merely exemplary, and various kinds of modifications are possible without departing from the scope of the present disclosure. For example, any modification performed as appropriate without departing from the scope of the present disclosure belongs to the technical scope of the present invention.

What is claimed is:

1. A display device comprising:
   a display panel having a display region in which a plurality of pixel rows each composed of a plurality of pixels arranged in a first direction are arranged in a second direction orthogonal to the first direction;
   a scanning circuit configured to supply a drive signal to scan the plurality of pixel rows;
   a light source configured to emit light toward the display panel; and
   a light source control circuit configured to control light emission timing of the light source,
   wherein the display region is divided into a plurality of regions in the second direction and includes
     a first region including two or more pixel rows consecutively arranged in the second direction, and
     a second region except for the first region,
   wherein the scanning circuit
     sequentially scans the pixel rows in the first region, and
     simultaneously scans two or more pixel rows consecutively arranged in the second direction in the second region,
   wherein one frame period in which one screen is displayed in the display region includes
     a light emission period in which the light source emits light,
     a first drive period in which the pixel rows included in the first region are scanned, and
     a second drive period in which the pixel rows included in the second region are scanned, and
   wherein the first drive period is provided immediately after the light emission period.

2. The display device according to claim 1,
   wherein the second region includes
     a third region contacting the first region and including two or more pixel rows consecutively arranged in the second direction, and
     a fourth region except for the third region, and
   wherein the number of pixel rows simultaneously scanned in the third region is smaller than the number of pixel rows simultaneously scanned in the fourth region.

3. The display device according to claim 1,
   wherein the second region
     contacts the first region and includes two or more pixel rows consecutively arranged in the second direction, and
     further includes a plurality of regions sequentially contacting in the second direction, and
   wherein the number of pixel rows simultaneously scanned in the second region is different from region to region.

4. The display device according to claim 1,
   wherein the light emission period is provided in a period from completion timing of a response period of pixels included in the first region to start timing of the first drive period of a next frame.

5. The display device according to claim 1, further comprising a sight line detection sensor configured to detect at least a user viewpoint in the second direction on the display region,
   wherein the first region includes a detection position of the viewpoint on the display region.

6. A display device comprising:
   a display panel having a display region in which a plurality of pixel rows each composed of a plurality of pixels arranged in a first direction are arranged in a second direction orthogonal to the first direction;
   a scanning circuit configured to supply a drive signal to scan the plurality of pixel rows;
   a light source configured to emit light toward the display panel; and
   a light source control circuit configured to control light emission timing of the light source,
   wherein the display region is divided into a plurality of regions in the second direction and includes
     a first region including two or more pixel rows consecutively arranged in the second direction, and
     a second region except for the first region,
   wherein the scanning circuit
     sequentially scans the pixel rows in the first region, and
     simultaneously scans two or more pixel rows consecutively arranged in the second direction in the second region,
   wherein one frame period in which one screen is displayed in the display region includes
     a light emission period in which the light source emits light,
     a first drive period in which the pixel rows included in the first region are scanned, and
     a second drive period in which the pixel rows included in the second region are scanned,
   wherein the light source has a plurality of light emission regions divided in the second direction, and
   wherein the first drive period is provided immediately after a light emission period of a light emission region overlapping the first region among the plurality of light emission regions.

7. A display device comprising:
   a display panel having a display region in which a plurality of pixel rows each composed of a plurality of pixels arranged in a first direction are arranged in a second direction orthogonal to the first direction;
   a scanning circuit configured to supply a drive signal to scan the plurality of pixel rows;
   a light source configured to emit light toward the display panel; and
   a light source control circuit configured to control light emission timing of the light source,
   wherein the display region is divided into a plurality of regions in the second direction and includes
     a first region including two or more pixel rows consecutively arranged in the second direction, and
     a second region except for the first region,
   wherein the scanning circuit
     sequentially scans the pixel rows in the first region, and simultaneously scans two or more pixel rows consecutively arranged in the second direction in the second region, wherein one frame period in which one screen is displayed in the display region includes
- a light emission period in which the light source emits light,
- a first drive period in which the pixel rows included in the first region are scanned, and
- a second drive period in which the pixel rows included in the second region are scanned, wherein the light source has a plurality of light emission regions divided in the second direction, wherein the light emission period of a light emission region overlapping the first region among the plurality of light emission regions is provided in a period from completion timing of a response period of pixels included in the first region to start timing of the first drive period of a next frame, and wherein the light emission period of a light emission region overlapping the second region among the plurality of light emission regions is provided in a period from completion timing of a response period of pixels included in the second region to start timing of the second drive period of the next frame.

8. The display device according to claim 7, further comprising a sight line detection sensor configured to detect at least a user viewpoint in the second direction on the display region,
wherein the first region includes a detection position of the viewpoint on the display region.

9. The display device according to claim 8,
wherein start timing of the first drive period relative to the light emission period of the light emission region overlapping the first region is substantially constant irrespective of the detection position of the viewpoint on the display region.

10. The display device according to claim 9,
wherein the second drive period is provided immediately after the first drive period, and a blanking period provided between the second drive period and the first drive period of the next frame is substantially constant irrespective of the detection position of the viewpoint on the display region.

11. The display device according to claim 6,
wherein the second region includes
- a third region contacting the first region and including two or more pixel rows consecutively arranged in the second direction, and
- a fourth region except for the third region, and wherein the number of pixel rows simultaneously scanned in the third region is smaller than the number of pixel rows simultaneously scanned in the fourth region.

12. The display device according to claim 6,
wherein the second region
- contacts the first region and includes two or more pixel rows consecutively arranged in the second direction, and
- further includes a plurality of regions sequentially contacting in the second direction, and wherein the number of pixel rows simultaneously scanned in the second region is different from region to region.

13. The display device according to claim 6, further comprising a sight line detection sensor configured to detect at least a user viewpoint in the second direction on the display region,
wherein the first region includes a detection position of the viewpoint on the display region.

14. The display device according to claim 7,
wherein the second region includes
- a third region contacting the first region and including two or more pixel rows consecutively arranged in the second direction, and
- a fourth region except for the third region, and wherein the number of pixel rows simultaneously scanned in the third region is smaller than the number of pixel rows simultaneously scanned in the fourth region.

15. The display device according to claim 7,
wherein the second region
- contacts the first region and includes two or more pixel rows consecutively arranged in the second direction, and
- further includes a plurality of regions sequentially contacting in the second direction, and wherein the number of pixel rows simultaneously scanned in the second region is different from region to region.

* * * * *